PHONOGRAPH RECORD DISK WITH SPEED CONTROL RING

Filed Dec. 9, 1952 4 Sheets-Sheet 1

Herman H. Mueller
INVENTOR.

BY Clarence A. O'Brien and Harvey B. Jacobson
Attorneys

Jan. 8, 1957 H. H. MUELLER 2,776,838

PHONOGRAPH RECORD DISK WITH SPEED CONTROL RING

Filed Dec. 9, 1952 4 Sheets-Sheet 2

Herman H. Mueller
INVENTOR.

BY Clarence A. O'Brien
and Harvey B. Jacobson
Attorneys

Herman H. Mueller

INVENTOR.

BY Clarence A. O'Brien and Harvey B. Jacobson

Attorneys

Jan. 8, 1957 H. H. MUELLER 2,776,838

PHONOGRAPH RECORD DISK WITH SPEED CONTROL RING

Filed Dec. 9, 1952 4 Sheets-Sheet 4

Herman H. Mueller
INVENTOR.

BY Clarence A. O'Brien
and Harvey B. Jacobson
Attorneys

United States Patent Office 2,776,838

Patented Jan. 8, 1957

2,776,838

PHONOGRAPH RECORD DISK WITH SPEED CONTROL RING

Herman H. Mueller, Ephrata, Pa.

Application December 9, 1952, Serial No. 324,993

12 Claims. (Cl. 274—42)

This invention comprises novel and useful improvements in a phonograph record disk with speed control ring, and more generally relates to an interlocking, positive engagement phonograph record disk of the type disclosed but not claimed in my prior patent, No. 2,559,786 issued July 10, 1951, for Interlocking Phonograph Turntable Cover; and further relates to a phonograph record disk specifically adapted for use in the apparatuses disclosed in my copending applications, Serial Nos. 98,048; 161,519; 296,382; 296,558; 314,987; 318,365; 367,316 and 347,507.

The invention disclosed hereinafter also relates to subject matter set forth in my prior applications: Serial No. 98,048, filed June 9, 1949, for Automatic Interlocking Dual Phonograph Record Player, now Patent No. 2,729,455 issued January 3, 1956; Serial No. 296,558 filed July 1, 1952, for Tone Arm and Control Mechanism for Automatic Interlocking Dual Phonograph Record Player; Serial No. 296,382 filed June 30, 1952, for Turntable and Drive for Automatic Interlocking Dual Phonograph Record Player; Serial No. 314,987 filed October 16, 1952, for Automatic Interlocking Dual Phonograph Record Player.

The primary objects and purposes of this invention are to provide a construction of a record disk whereby relative rotation or slippage between a phonograph record disk and an adjacent turntable, or between adjacent phonograph record disks shall be positively prevented; and whereby the sound tracks of record disks will be maintained in spaced relation with respect to each other or to an adjacent turntable, to thereby prevent attrition or wear which would result from the rubbing of the sound tracks.

Another important object of this invention is to provide a positive engagement interlocking construction for record disks which will facilitate their storage without relative radial or rotational movement, in the novel record storage album forming the subject matter of my prior application, Serial No. 161,519 filed May 12, 1950, for Phonograph Record Disks Safety Interlocking Storage Album, now Patent No. 2,670,261 issued February 23, 1954.

It is a further important object of this invention to provide a phonograph record disk construction, either with or without the above mentioned features, and which shall have applied thereto control rings or cam surfaces whereby the record disk is adapted to actuate mechanism for controlling the speed of rotation of the turntable, and/or the selection and positioning of a stylus needle of the proper character for playing the phonograph record disk.

More specifically, it is a primary purpose of this invention to provide a construction for attaining the above mentioned previous objects which may be readily applied to conventional record disks at any time after their fabrication, or may be incorporated into record disks during their manufacture.

Yet another specific object of the invention is to provide a phonograph record disk wherein the spindle aperture of the same shall be reinforced to withstand wear and distortion by repeated usage of the disk upon an automatic phonograph record player.

A still further specific object of the invention is to provide means located at the central portion of a record disk adjacent the spindle aperture of the same and within the inner confines of the sound track of the record for providing an interlocking engagement of a record with either an adjacent record or a turntable; and for spacing the record from adjacent records or a turntable to prevent contact between the sound track portions of adjacent records.

A still further specific object of the invention is to provide in a phonograph record disk of either the interlocking or conventional construction, annular tracks or rings located at the central portion of a record disk, surrounding the spindle aperture and within the inner confines of the sound track of the record which shall serve to automatically actuate suitable mechanism to automatically adjust the stylus needles of the tone arm and/or the speed of rotation of the turntable in accordance with the particular record upon which the control rings are provided.

Yet another essential object of this invention resides in the provision of an interlocking construction of phonograph records which positively prevents any slippage between a record and the other records of a stack; and between a record and any adjacent record whether alone or in a stack and which is carried or driven by the turntable; and to positively insure that each such record shall be rotated at exactly the same speed of rotation as the turntable, to thereby obtain perfect accuracy and fidelity of tone reproduction of the record.

A further and essential object of the invention is to provide means whereby a record may be automatically or manually positively interlocked with and prevented from relative rotation with respect to an adjacent contacting record or turntable and wherein the sound track of the record will be appropriately spaced from the sound track of a contacting record or the surface of a contacting turntable.

A further very important object of the invention is to provide a construction in accordance with the foregoing objects which shall not materially increase the weight or cost of a record or detract from the appearance thereof.

Still another important aim of this invention resides in the provision of an interlocking and positive engagement construction for records which will reinforce, stiffen and strengthen the central portion of a record within the sound track and surrounding the spindle aperture to thereby minimize warping and breakage of a record.

These, together with various ancillary features and objects of the invention, which will later become apparent as the following description proceeds, are attained by the present invention, a preferred embodiment of which has been illustrated by way of example only in the accompanying drawings wherein like numerals refer to like parts throughout, and in which.

Figure 6:
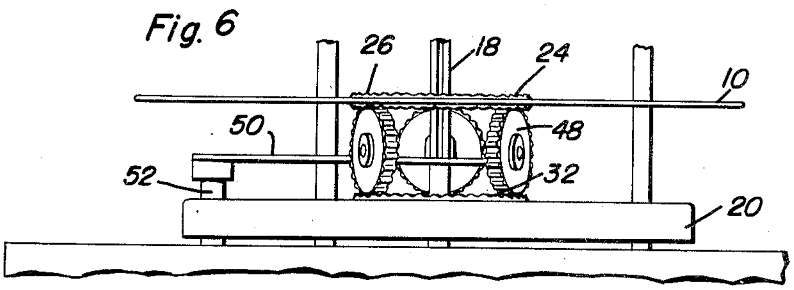
Figure 6 is a fragmentary side elevational view of the arrangement of Figure 5, and showing the manner in which a record is supported above and driven from the turntable through a supporting and driving means, without any slippage therebetween.
Figure 7:
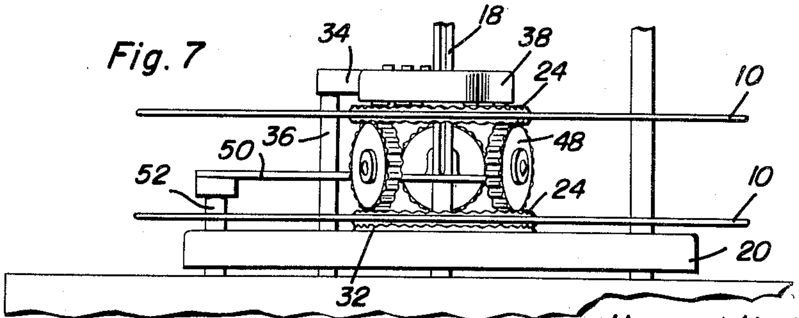
Figure 8:
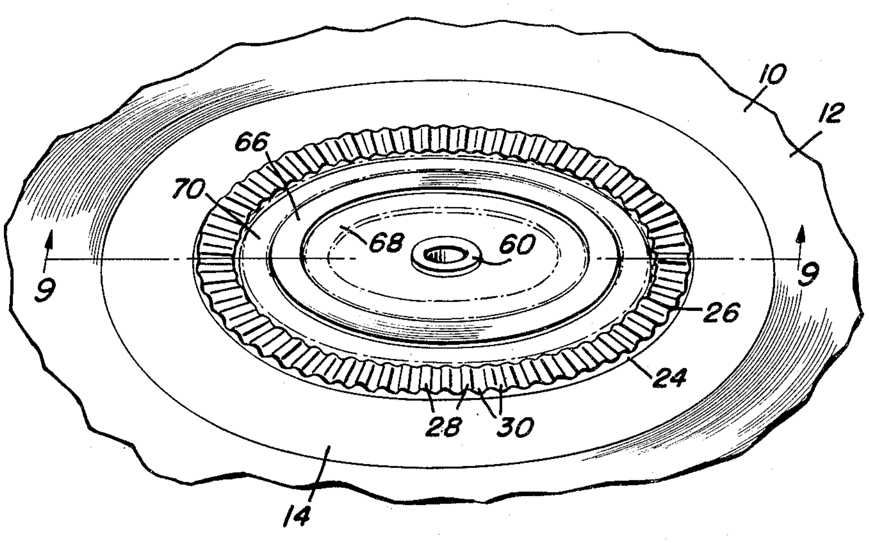
Figure 9:
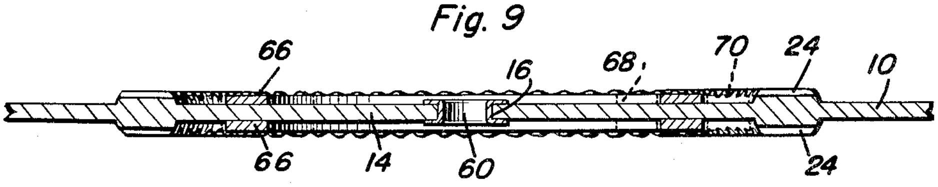
Figure 10:
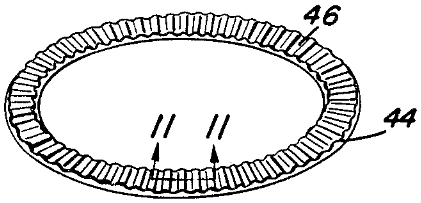
Figure 11:
Figure 12:
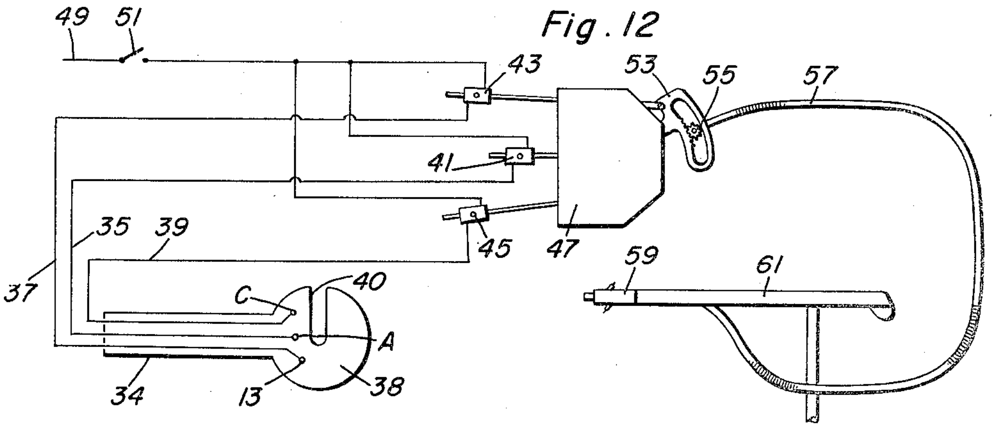
Figure 13:
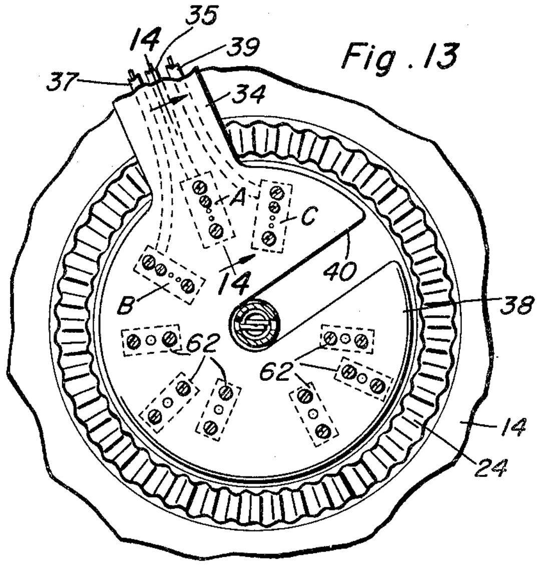
Figure 14:
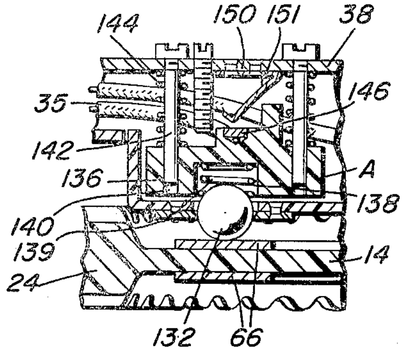
Figure 15:
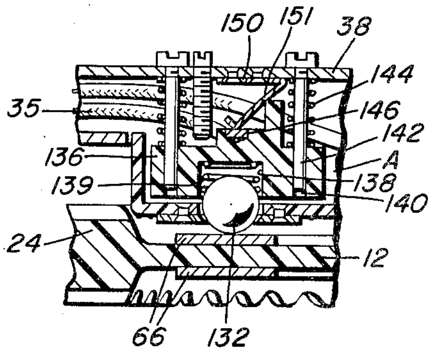

Figure 7 is a view similar to Figure 6 but showing a record mounted upon the supporting means for positive, non-slipping driving engagement thereby together with a pressure means for maintaining the interlocking and non-slipping driving engagement between the record being played, the record driving and supporting means, a turntable, and a record interposed between the turntable and the record supporting and driving means;

Figure 8 is a fragmentary perspective view of a portion of a phonograph record in accordance with the principles of this invention;

Figure 9 is a vertical transverse sectional view, parts being broken away, taken substantially upon the plane indicated by the section line 9—9 of Figure 8;

Figure 10 is a perspective view of a combined spacing ring and driving and interlocking ring which may be applied to either a record or a turntable in accordance with this invention;

Figure 11 is a fragmentary vertical sectional view taken substantially upon the plane indicated by the section line 11—11 of Figure 10;

Figure 12 is a diagrammatic view illustrating the electrical circuits of the needle changer, speed changer and the micro switches in the pressure head, which are activated by the speed control rings of the record disk;

Figure 13 is a fragmentary top plan view of the pressure head and its relation to a record disk, certain concealed parts being shown in dotted lines therein;

Figure 14 is an enlarged detail view taken substantially upon the plane indicated by the section line 14—14 of Figure 13 and showing details of one of the micro switches in the inoperative position of the latter; and Figure 15 is a view of the switch of Figure 14 in the operative position of the same.

It is well known that dust or grit collects readily in the sound track of records, forming an abrasive which wears the sound grooves each time the record is played. After each traversal of the sound track by a needle, this accumulated grit and broken portions of the sound tracks will be found in the top sides of each sound track or on the needle.

When this abrasive grit accumulation is deposited between adjacent surfaces of records, any relative rubbing or sliding therebetween will cause damage to the sound tracks.

Moreover, in addition to this normal wear, records further become damaged by reason of relatively hard usage occasioned by their employment in conventional phonograph record players and changers. In such machines, a stack of a plurality of records is placed upon the turntable, and the top record upon whose sound track the phonograph needle is traveling, is driven by the frictional engagement existing between the adjacent surfaces of each of the records therebelow and the upper surface of the turntable. Further, the sudden dropping of a stationary record from the bottom of a stack upon the rotating turntable and the records thereon causes relative sliding between the records. Obviously, relative rotation of any record in the stack produces abrasion and attrition upon the adjacent, contacting, sound tracks as well as prevents perfect tonal reproduction of the record being played.

To aggregate the foregoing difficulty, it is well known that records of molded plastic composition quickly become slightly warped and when these are stacked, the warped surfaces, including the sound tracks thereon, rub upon adjacent surfaces of adjacent records, thereby additionally wearing the sound tracks thereon and impairing the life and efficiency of the record. Further, the occasional sliding and creeping of one record upon the adjacent surface of a contacting record, when a stack of records rests upon the turntable, frequently produces an additional attrition upon the contacting surface. Vibration of the records on the spindle, stack or turntable further increases this last mentioned detrimental effect.

The fundamental purpose of this invention therefore resides in providing an attachment and construction for obviating the above mentioned difficulty, prolonging the life of a record and greatly enhancing the fidelity of the tonal reproduction as originally inscribed thereon. To attain this fundamental purpose, there are provided raised surfaces on both sides of adjacent records upon the central portions thereof within the sound track, which serve both to space adjacent records from each other a sufficient distance to prevent contact even if the records are warped; which strengthen, reinforce and rigidify the records; and which provide interlocking engagement surfaces to positively prevent all relative rotation between the adjacent records when the same are in contact with each other.

Reference is now made more specifically to the accompanying drawings, wherein like numerals designate similar parts throughout the various views. There is provided a substantially conventional form of phonograph record disk 10, provided with a customary sound track 12, the sound track being positioned radially outwardly of a central portion 14 of the disk, this central portion having the customary aperture 16 by means of which the record is placed upon a spindle 18. Customarily, a stack of records is positioned upon a spindle 18 in an automatic phonograph record player, the records being positioned and disposed above a turntable 20 and held thereabove by a supporting device 22 which may incorporate therein a conventional and known form of apparatus for dispensing records singly from the bottom of the stack to be played by the apparatus. Alternatively, of course, there may be utilized the record dispensing and supporting device shown in my copending application, Serial No. 318,365, filed November 3, 1952, for Record Lowering and Releasing Means for Automatic Interlocking and Conventional Record Players.

In accordance with the present invention, means are provided for positively preventing any slippage or relative rotation between adjacent records of a stack of records or between a record and the turntable, and simultaneously for spacing the records from each other by a sufficient distance to prevent contact of the sound tracks of the records, even though the sound track portions of the records may be warped.

For that purpose, the central portion 14 of the record and within the sound track 12 thereof, is provided with an annular elevated or raised portion, preferably upon both sides of the record, this ring-like portion being indicated by the numeral 24. The ring 24 is provided upon both sides of the record with an interlocking non-slipping surface which is indicated by the numeral 26 and which may be of various desired shapes or forms of any requisite character. Preferably, this surface is provided with an annular series of alternate peaks and projections 28 separated by depressions 30. It will be appreciated that the actual shape of this interlocking driving surface and of the projections 28 which constitute teeth and the valleys 30 therebetween will depend upon the particular apparatus with which the records having these interlocking surfaces are to be employed.

In some instances, the sides of the teeth or projections 28 may be substantially perpendicular to the face of the record, so that no possible slippage will occur as long as the projections of adjacent interlocking surfaces are in engagement with each other. In other instances, a more sinuous contour of the interlocking surfaces may be provided, as suggested in Figure 4, so as to admit of a smoother and self-seating engagement of adjacent surfaces of adjacent records. In any event, however, it is an essential feature of this invention that these surfaces shall be of such a character as to positively prevent any possible slippage of one record upon the other or upon the turntable during the engagement of records with each other and with the turntable. Obviously, where the sides of the projections 28 are disposed at relatively gentle angles with respect to the faces of the records 10, a pressure means may be provided for holding the records with their interlocking surfaces in secure engagement with each other and with the corresponding annular interlocking surface 32 of the turntable 20 which is complementary to the surfaces 26 of the record disks.

Figure 1:
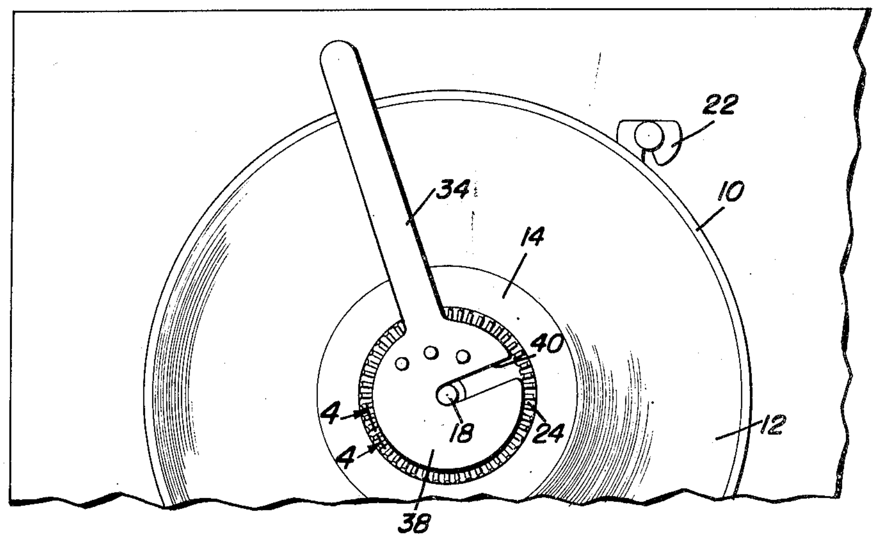
Figure 1 is a fragmentary top plan view of a portion of the phonograph record player, which may be of the character set forth in my application, Serial No. 98,048, or any of my other above identified applications, having operatively positioned thereon a record incorporating therein the principles of this invention.
Figure 2:
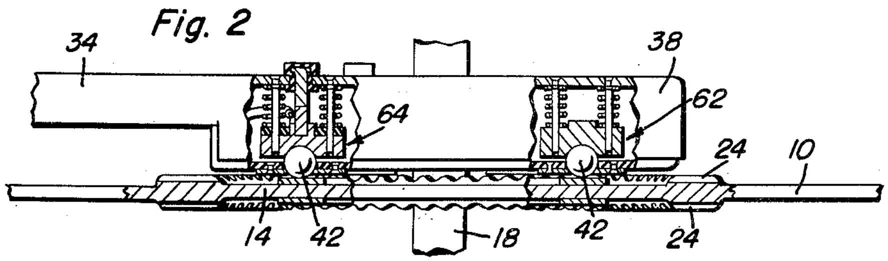
Figure 2 is an elevational detailed view taken upon an enlarged scale of the pressure head, parts being broken away and shown in section, and showing one of a stack of records supported in playing position for operation above a turntable, the apparatus being illustrated as that disclosed in my copending application, Serial No. 347,507.
Figure 3:
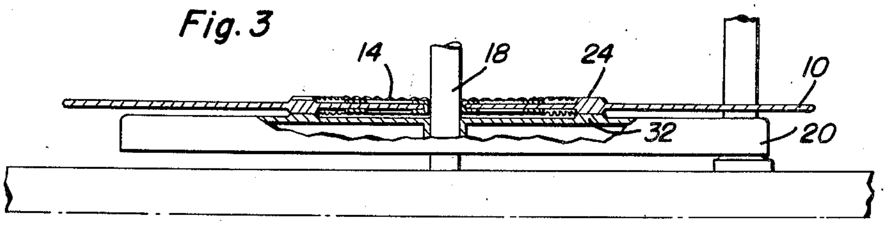
Figure 3 is a view similar to Figure 2 but showing a record seated upon and interlockingly engaged with a turntable for positive non-slipping rotation thereby in accordance with this invention.

Thus, referring to Figures 1, 2, and 7 the record player may be provided with a pressure arm 34 carried by a vertical shaft 36, see Figure 7, whereby the arm may be raised or lowered and may be swung horizontally by the mechanism of the record player, this arm having at its radially inward end a plate 38 comprising a head and having an arcuate slot 40 adapted to engage and disengage the spindle 18 during horizontal swinging movement of the pressure arm.

Upon its undersurface, the plate or head 38 of the pressure arm is provided with suitable anti-friction bearings or rollers 42 which are adapted to engage, rest upon and apply pressure to the central portion 14 of a record 10, within the sound track of the same, whereby this record may be held in tight engagement with an adjacent record 10 of a stack of records; or against the interlocking surface 32 of the turntable 20 if the record is engaged therewith, or against a supporting and driving means, as shown in Figures 6 and 7 and referred to hereinafter. The actual construction of the pressure arm head 38 has been fully illustrated and claimed in my copending application, Serial No. 347,507 and will be referred to hereinafter briefly.

It will thus be seen that regardless of the shape and contour of the interlocking surfaces, a record will be held against relative rotation with respect to its adjacent record in contact therewith, or relative to the turntable or supporting and driving means if the record is in contact therewith.

It should be observed that the annular portion 24 of the record serves also to support the records at the central portion of the same within the sound tracks, and to space the records from each other. Thus, even though the sound track portion of a particular record in a stack of records may be warped, the annular projections 24 will space and prevent contact between the sound track portions, thus obviating a heretofore unavoidable source of wear and damage to the sound track of records.

Moreover, the rings 24 will serve as a reinforcement for the thin, sheet-like material of the record disk, constituting an inexpensive stiffener or rigidifying means therefor, minimizing warping or breaking of the record.

The above mentioned annular projections 24 and their interlocking surfaces 26 may be formed upon the records in any desired manner. In some instances, it may be preferred to form the same upon the record as by molding the plastic materials during the formation of the record. Obviously, the dimensions and proportions of the interlocking surfaces will be such as to secure the hereinbefore mentioned desired results of spacing, reinforcing or rigidifying and interlocking non-slipping engagement.

Figure 4:
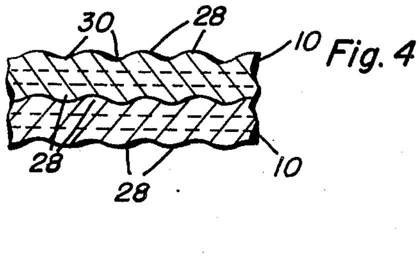
Figure 4 is a detail view upon a large scale taken substantially upon the plane indicated by the section line 4—4 of Figure 1 and showing the manner in which the adjacent surfaces of two records, or a record and a turntable, are interlockingly engaged for positive and non-slipping rotation as a unit.

When the interlocking surfaces 26 are formed in the material of a record by molding, it will be seen that the material displaced from one surface of the projection 24 by pressing a depression or valley 30 therein results in the forming of the projections 28 on the opposite face. This results in a more even distribution of material during the fabrication, and provides complementary registering valleys and projections for a precise and compact registration and engagement of adjacent interlocking surfaces of adjacent records, as shown in Figure 4.

In addition, however, to forming the records with the interlocking annular spacing projections during the process of fabricating the records, it is also possible to economically obtain the results and purposes of this invention, at least to some extent, by applying separately fabricated annular interlocking and spacing rings to the records after their fabrication. Thus, as shown in Figures 10 and 11, an annular ring 44 may be formed of any suitable material, such as a plastic, a fiber composition, or a suitable metallic material, and may be secured to the surface of a record upon the central portion of the same and within the sound track of the record as by adhesive or any other desired means. These rings 44 will be provided with toothed or interlocking surfaces 46 corresponding to the previously mentioned surfaces 26 having projections 28 and valleys 30, and serving the same purpose.

The particular record disk having the spacing and interlocking annular projections, while useful with any conventional record changer and player, as set forth hereinbefore, is particularly useful in a phonograph record player of the character set forth in my above identified pending applications.

Figure 5:
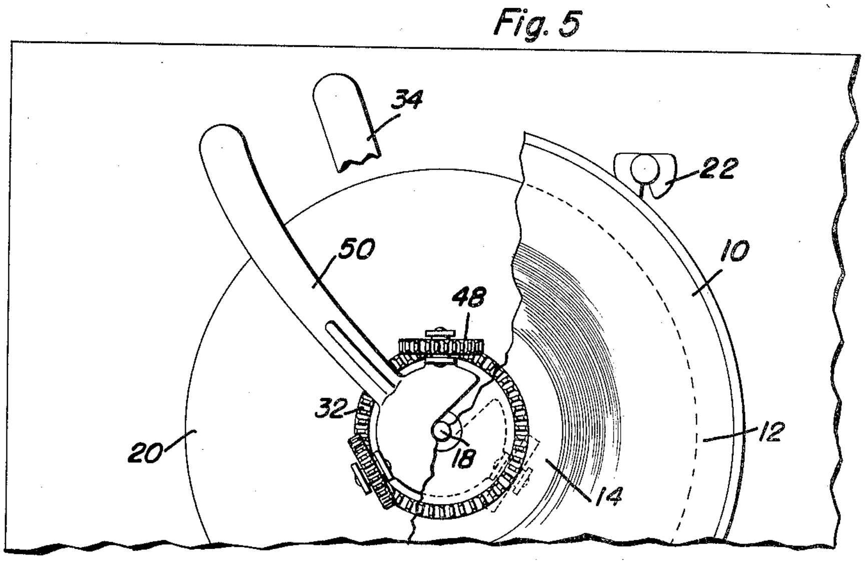
Figure 5 is a fragmentary top plan view, parts being broken away, of a portion of a record player showing a record supporting and driving means having an interlocking and non-slipping engagement with the driving ring portion of a record.

Thus, as shown in Figures 5–7, the records 10 are associated with such an apparatus which includes the turntable 20 having the interlocking surface 32, together with a record supporting and driving means of a construction disclosed and claimed in my copending application, Serial No. 98,048.

Briefly, the record supporting and driving means includes a plurality of supporting and driving rollers 48, each journaled upon a horizontal arm 50 mounted upon a vertically movable and oscillatable vertical shaft 52. The toothed surfaces of the rollers are engageable with the interlocking surfaces 24 upon the bottom face of a record for supporting and rotating the same; and with the surface 32 of the turntable, as in Figure 6, or with the interlocking top surface of a record whose interlocking bottom surface is engaged by the turntable surface 32, as in Figure 7. In either arrangement, a positive, non-slipping driving engagement is established between the turntable and the rollers 48; and between the latter and the record supported and rotated by the rollers. This positive, non-slipping driving engagement is augmented by the engagement of the pressure plate 38 of Figure 2 upon the record supported by the rollers 48, in the manner illustrated in Figure 7.

Figure 6 illustrates the position of the mechanism when the first record to be played has been released from the stack of records and is supported upon the rollers 48, while the latter are in contact with the driving surface 32 of the turntable 20. It is evident that there is a geared, positive, non-slipping interlocking driving engagement between the turntable and the intermediate rollers 48 and between the latter and the record disks supported thereon. This engagement is rendered more certain and safe by the engagement of the pressure plate and arm, which have been omitted from Figure 6 in the interest of simplicity of illustration.

Figure 7 is similar to Figure 6, but illustrates the arrangement after a record has been played upon both sides and then lowered to the turntable. The rollers now rest upon the record which rests upon and is interlocked with the turntable and support a second record for driving the same.

It will thus be apparent that the interlocking surfaces of the records are essential in order to transmit without slippage or speed variation the drive from the turntable through the stack of records resting thereon, and through the supporting rollers for rotating in the reverse direction the supporting record 10 during the playing of the undersurface of the same.

It will thus be seen that the positive interlocking surfaces of this record permit driving the record to be played at the desired speed of rotation, without slippage or variation, from the turntable either directly or indirectly as set forth in the various arrangements described hereinbefore.

Referring now more particularly to Figures 8 and 9, it will be apparent that the spindle aperture 16 of the central portion 14 of a record is strengthened and reinforced as by applying an eyelet or bushing 60 thereto. This bushing may be of any desired construction, and may conveniently consist of a thin metal sleeve disposed through the aperture and having its opposite ends flanged over to embrace the opposite sides of the central portion of the record. This metal bushing provides a satisfactory means for withstanding the wear of the spindle against the inside periphery of the aperture of the record, thereby greatly increasing the effective life of the record.

In my copending application, Serial No. 296,382, there is disposed a mechanism whereby the speed of rotation of the turntable may be varied in order to adapt the same for the playing of records requiring different speeds of rotation. In my copending application, Serial No. 347,507, there is disclosed a mechanism whereby the speed of rotation of the turntable may be automatically adjusted to the proper speed for playing a particular record; and whereby the stylus of a tone arm may be adjusted to position the proper needle for playing the sound grooves of different records. The automatic mechanism of my last mentioned copending application is adapted to be controlled by control tracks or rings carried by the central portion 14 of a record, through the aid of micro-switches forming a part of the electrical control circuit of that mechanism, such micro-switches being disposed in the pressure head 38 of the pressure arm 34.

Figure 12 illustrates diagrammatically the electric circuit and control means for this purpose. Briefly, the pressure head is provided with a plurality of micro switch units 64, each located at a different distance from the axis of rotation of a record when the pressure head sets down thereon, as shown at A, B and C.

Electric conductors 35, 37 and 39 connect the switches A, B and C, respectively with the solenoids 41, 43, and 45 which are operatively connected with the turntable speed changer mechanism indicated diagrammatically at 47. As indicated in Figure 12, electric current is supplied from any suitable source, as from a lead 49 and control switch 51, to the solenoids, and is grounded through a selected micro switch A, B or C as set forth hereinafter.

The speed changer mechanism includes a rack member 53 to which is connected a pinion 55 carried at one end of the flexible cable assembly 57 whose other end is operatively connected to the needle assembly of the tone arm 61. The arrangement is such that energization of a solenoid causes a shifting of the speed changer 47 to drive the turntable 20 at a selected speed, and simultaneously adjust the needle assembly 59 to position the proper needle for the selected speed of rotation.

Since the details of the speed changer, needle changer and pressure head and switches, and their association with each other are immaterial to the record disk claimed herein, reference is made to my copending application Ser. No. 347,507, which sets forth in detail and claims therein this subject matter.

Referring to Figures 2 and 13, it will be appreciated that the pressure head 38 is provided with two sets of ball bearing members, each of the ball bearing members supporting one of the anti-friction bearings 42. One set of the ball bearing members contains only ball bearings for applying pressure to the record engaged by the pressure head, while the other set contains bearing members which serve the dual function of applying pressure to the record disk and also actuating micro-switch contacts for controlling the electric circuits whereby the speed of the turntable and the selection and positioning of a tone arm stylus needle is automatically effected in accordance with the control tracks on the record disk.

Thus, as shown in Figure 2, the bearing assemblies 62 constitute anti-friction ball bearing pressure means, while the assemblies 64 constitute combined ball bearing pressure means and micro-switch elements. The function and specific structures of these assemblies have been set forth in detail and their operation is disclosed and claimed in my copending application, Serial No. 347,507, and since the present invention does not relate to this construction but merely to the novel record disk for controlling this structure, a further description of the construction and operation of the same appears to be unnecessary.

Referring now again to Figures 8 and 9, it will be seen that annular rings or tracks 66 are mounted upon the central portion 14 of a record disk in concentric relation with respect to the spindle aperture 16 therethrough, and preferably within the interlocking driving ring 24. The annular ring 66 may be constructed or fabricated as a separate element, in the same manner as the ring 44 of Figure 10, and may be separately applied and secured to record disks by adhesive or any other suitable means. Alternatively, of course, the control ring 66 may be integrally formed upon the central portion of the record disk during the fabrication of the same.

However, it is essential for the purposes of this invention that the control ring 66 shall be spaced at a specified radial distance from the axis of the aperture 16. It is contemplated that the ring 66 may be placed at different radial distances in accordance with the speed or rotation for which the record disk is designed. As shown in full lines in Figures 8 and 9, the control ring 66 is placed at a distance which will actuate one of the microswitch units 64, whether A, B or C, of Figures 12 and 13, which is positioned for engagement by that particular control ring, whereby the turntable will be caused to rotate at a particular speed and a particular stylus needle will be selected and positioned in the tone arm assembly. Alternatively, when the control ring 66 is moved to positions either radially inwardly or outwardly of the full line position, as for example to the dotted line positions shown at 68 or 70 in Figures 8 and 9, other ones of the set of micro-switch elements 64 will be actuated to energize the selected control circuit and thereby vary and adjust the speed of the turntable and the tone arm stylus needle to be used with that particular record.

It should be particularly observed that in this invention, conventional records may be modified for usage as positive, inter-locking non-slipping records; or in accordance with the automatic speed control and automatic needle changing control of a record player as set forth in my copending application, Serial No. 347,507, by merely applying appropriate interlocking rings 44 or speed control rings 66 to the central portions of record disks.

Although the record disk claimed herein is not limited to any particular construction of switch 64, that claimed in my copending application, Ser. No. 347,507 and illustrated in Figures 3–10 thereof, and shown herein in Figures 14, 15, may be satisfactorily employed. Since each of the units 64 whether A, B or C, is identical, that indicated at A will be considered in detail, the same reference numeral being employed, wherever possible, as in my last mentioned copending application.

A movable electric contact 146 is carried by the dielectric block 136 and is connected with one of the connectors 35, 37 or 39. A stationary contact 150 having a resilient arm 151 is mounted and grounded upon the pressure head 38.

The block 136 has guide bores 140 slidably receiving stationary vertical guide rods 142 depending from the top wall of the pressure head, compression springs 144 urging the block 136 downwardly whereby the contacts 146 and 151 will be normally disengaged as shown in Figure 14. In order to actuate the switch, the block 136 has a recess 138 receiving a spring 139 bearing against a ball 132. The support units 62 are identical with the switch unit 64 except that the electrical contacts are omitted therefrom.

The arrangement of units 64 and 62 in the pressure head is such that when the head sets down on a record disk, the ring 66 of the latter will be operatively engaged by the balls 132 of one of the switches A, B or C of the set of support units 62 which lie at the same radial distance from the center of the pressure head and record, as shown in Figures 14 and 15.

When contact of the balls 132 with the control ring 66 is first made, as in Figure 14, the switch contacts are not closed. After the head has completed its set down, as in Figure 15, the balls 132 are depressed by the ring 66, compressing the spring 139, lifting the block 136 and closing the switch contacts 146 and 151, thereby energizing the associated solenoid and operating the speed changer and needle changer.

From the foregoing, the construction and operation of the device will be readily understood and further explanation is believed to be unnecessary. However, since numerous modifications and changes will occur to those skilled in the art, it is not desired to limit the invention to the exact construction shown and described, and accordingly, all suitable modifications and equivalents may be resorted to, falling within the scope of the appended claims.

What is claimed as new is as follows:

1. A phonograph record disk for use with a phonograph record player of the type having a rotatable turntable with a speed changer mechanism therefor, a pressure head adapted to set down upon the central portion and within the sound track of a record disk being played, said pressure head having a plurality of switch actuating mechanisms each at a different radial distance from the central spindle aperture of a record disk upon which the pressure head sets down, each switch actuating mechanism corresponding to a particular speed at which said turntable is to be rotated and being operatively connected to said speed changer mechanism; said record disk including a control ring within the sound track thereof and radially spaced from the spindle aperture the same radial distance as that of one of said switch actuating mechanisms, said ring being raised from the surface of the record disk a sufficient height to engage and actuate the corresponding one of the switch actuating mechanisms whereby to actuate the speed changer mechanism.

2. A phonograph record disk for use with a phonograph record player of the type having a rotatable turntable with a tone arm and a pair of needles together with a needle changer mechanism therefor, a pressure head adapted to set down upon the central portion and within the sound track of a record disk being played, said pressure head having a plurality of switch actuating mechanisms each at a different radial distance from the central spindle aperture of a record disk upon which the pressure head sets down, each switch actuating mechanism corresponding to a particular needle with which a record disk is to be played and being operatively connected to said needle changer mechanism; said record disk including a control ring within the sound track thereof and radially spaced from the spindle aperture the same radial distance as that of one of said switch actuating mechanisms, said ring being raised from the surface of the record disk a sufficient height to engage and actuate the corresponding one of the switch actuating mechanisms whereby to actuate the needle changer mechanism.

3. A phonograph record disk for use with a phonograph record player of the type having a rotatable turntable with a speed changer mechanism therefor, a tone arm and a pair of needles together with a needle changer mechanism therefor, a pressure head adapted to set down upon the central portion and within the sound track of a record disk being played, said pressure head having a plurality of switch actuating mechanisms each at a different radial distance from the central spindle aperture of a record disk upon which the pressure head sets down, each switch actuating mechanism corresponding to a particular speed at which said turntable is to be rotated and corresponding to a particular needle with which a record disk is to be played and being operatively connected to said speed and to said needle changer mechanism; said record disk including a control ring within the sound track thereof and radially spaced from the spindle aperture the same radial distance as that of one of said switch actuating mechanisms, said ring being raised from the surface of the record disk a sufficient height to engage and actuate the corresponding one of the switch actuating mechanisms whereby to actuate the speed and needle changer mechanism.

4. The combination of claim 1 including a raised, toothed annulus on said record disk between the sound track and said control ring whereby to establish a non-slipping, interlocking and positive drive connection with an adjacent complementary ring of another record disk or turntable or with an interconnecting means between the record and turntable.

5. The combination of claim 2 including a raised, toothed annulus on said record disk between the sound track and said control ring whereby to establish a non-slipping, interlocking and positive drive connection with an adjacent complementary ring of another record disk or turntable or with an interconnecting means between the record and turntable.

6. The combination of claim 3 including a raised toothed annulus on said record disk between the sound track and said control ring whereby to establish a non-slipping, interlocking and positive drive connection with an adjacent complementary ring of another record disk or turntable or with an interconnecting means between the record and turntable.

7. The combination of claim 1 wherein said control ring has a flat top surface which is equidistant from the plane of the adjacent surface of the record disk.

8. The combination of claim 2 wherein said control ring has a flat top surface which is equidistant from the plane of the adjacent surface of the record disk.

9. The combination of claim 3 wherein said control ring has a flat top surface which is equidistant from the plane of the adjacent surface of the record disk.

10. The combination of claim 1 including a raised, toothed annulus on said record disk between the sound track and said control ring whereby to establish a non-slipping, interlocking and positive drive connection with an adjacent complementary ring of another record disk or turntable or with an interconnecting means between the record and turntable, said toothed annulus comprising a plurality of alternate, sinuous, smoothly contoured elevations and depressions whereby the complementary surfaces of an adjacent annulus may readily engage in mated relation therewith.

11. The combination of claim 2 including a raised, toothed annulus on said record disk between the sound track and said control ring whereby to establish a non-slipping, interlocking and positive drive connection with an adjacent complementary ring of another record disk or turntable or with an interconnecting means between the record and turntable, said toothed annulus comprising a plurality of alternate, sinuous, smoothly contoured elevations and depressions whereby the complementary surfaces of an adjacent annulus may readily engage in mated relation therewith.

12. The combination of claim 3 including a raised toothed annulus on said record disk between the sound track and said control ring whereby to establish a non-slipping, interlocking and positive drive connection with an adjacent complementary ring of another record disk or turntable or with an interconnecting means between the record and turntable, said toothed annulus comprising a plurality of alternate, sinuous, smoothly contoured elevations and depressions whereby the complementary surfaces of an adjacent annulus may readily engage in mated relation therewith.

References Cited in the file of this patent

UNITED STATES PATENTS

| | | |
|---|---|---|
| 946,563 | Rhodes | Jan. 18, 1910 |
| 1,017,834 | Whitehead | Feb. 20, 1912 |
| 1,126,377 | Brophy | Jan. 26, 1915 |
| 1,307,020 | Peal | June 17, 1919 |
| 1,755,743 | Morrison | Apr. 22, 1930 |
| 1,804,453 | Basseches | May 12, 1931 |
| 2,113,401 | Goldsmith | Apr. 5, 1938 |
| 2,544,010 | Di Giannantonio | Mar. 6, 1951 |
| 2,646,284 | Weingarden | July 21, 1953 |
| 2,673,089 | Osborne | Mar. 23, 1954 |

FOREIGN PATENTS

| | | |
|---|---|---|
| 469,666 | Germany | Dec. 19, 1928 |
| 124,508 | Austria | Sept. 25, 1931 |
| 63,231 | Denmark | Mar. 5, 1945 |